W. WOOD.

TRAVELING CRANE.

No. 11,142. Reissued Feb. 3, 1891.

WITNESSES:

James H. Bell

A. J. Gahm

INVENTOR

Walter Wood

By Hollingsworth & Riley

Attorneys

THE NORRIS PETERS CO., PHOTO-LITHO., WASHINGTON, D. C.

W. WOOD.

TRAVELING CRANE.

No. 11,142. Reissued Feb. 3, 1891.

WITNESSES:

James H. Bell

A. J. Gahan

INVENTOR

Walter Wood

By Mallinckrodt & Paley

Attorneys

THE NORRIS PETERS CO., PHOTO-LITHO., WASHINGTON, D. C.

4 Sheets—Sheet 3.

W. WOOD.

TRAVELING CRANE.

No. 11,142. Reissued Feb. 3, 1891.

WITNESSES:

James H. Bell

A. J. Gahm

INVENTOR

Walter Wood

By Mellin Smith & Riley

Attorneys

THE NORRIS PETERS CO., PHOTO-LITHO., WASHINGTON, D. C.

W. WOOD.

TRAVELING CRANE.

No. 11,142. Reissued Feb. 3, 1891.

WITNESSES:
James H. Bell
A. J. Gahan

INVENTOR
Walter Wood
By Millington & Parker
Attorneys

THE NORRIS PETERS CO., PHOTO-LITHO., WASHINGTON, D. C.

UNITED STATES PATENT OFFICE.

WALTER WOOD, OF PHILADELPHIA, PENNSYLVANIA.

TRAVELING CRANE.

SPECIFICATION forming part of Reissued Letters Patent No. 11,142, dated February 3, 1891.

Original No. 433,157, dated July 29, 1890. Application for reissue filed September 18, 1890. Serial No. 365,423.

*To all whom it may concern:*

Be it known that I, WALTER WOOD, of Philadelphia, in the State of Pennsylvania, have invented certain new and useful Improvements in Traveling Cranes, whereof the following is a specification, reference being had to the accompanying drawings.

For convenience of description the three essential movements of a traveling crane may be classified as follows: first, the bridge movement or travel of the crane as a whole along its way; second, the trolley movement or travel of the trolley along the bridge, and, third, the lifting movement whereby the fall-block or other device suspended beneath the trolley and carrying the weight may be raised or lowered.

My present invention has reference only to the production of the first two of these movements—viz., the bridge movement and the trolley movement.

It consists, primarily, in the combination of a rope with the bridge and trolley in such a manner that the movement of either may be produced by the actuation of the same rope and from a point independent of the structure.

It further consists in a novel and peculiar arrangement of the rope by which the trolley is shifted.

Figure 1:
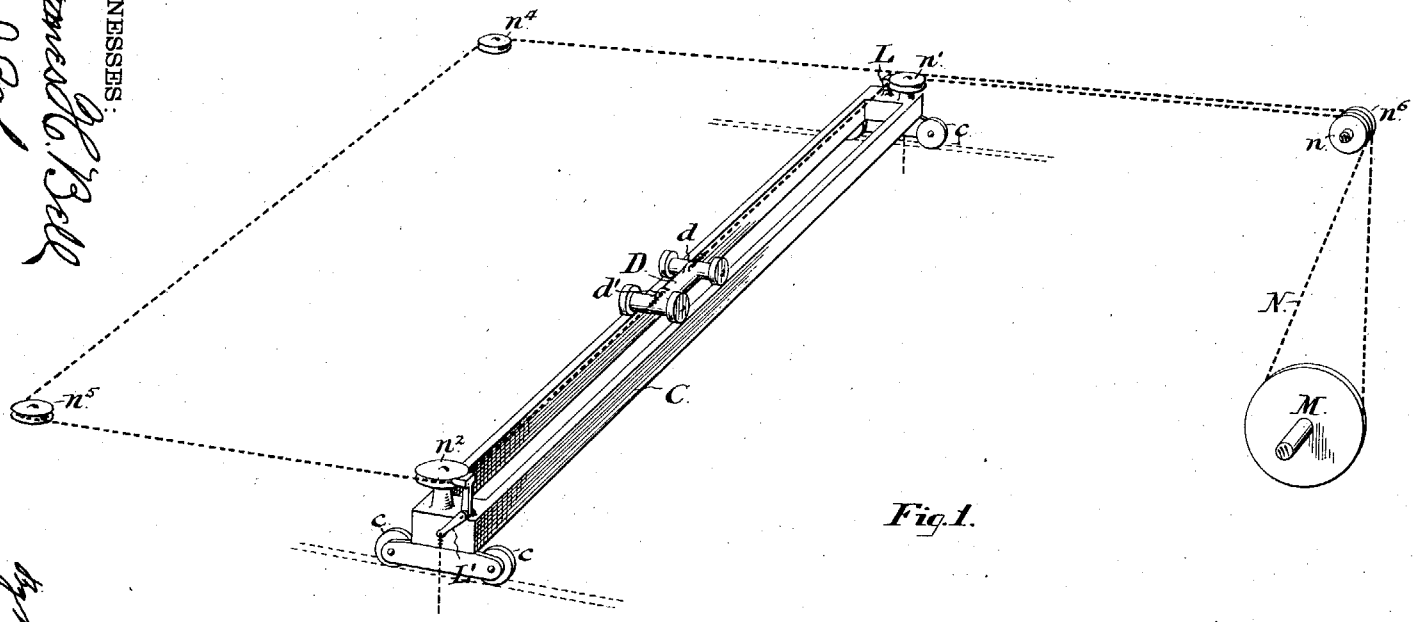
Figure 2:
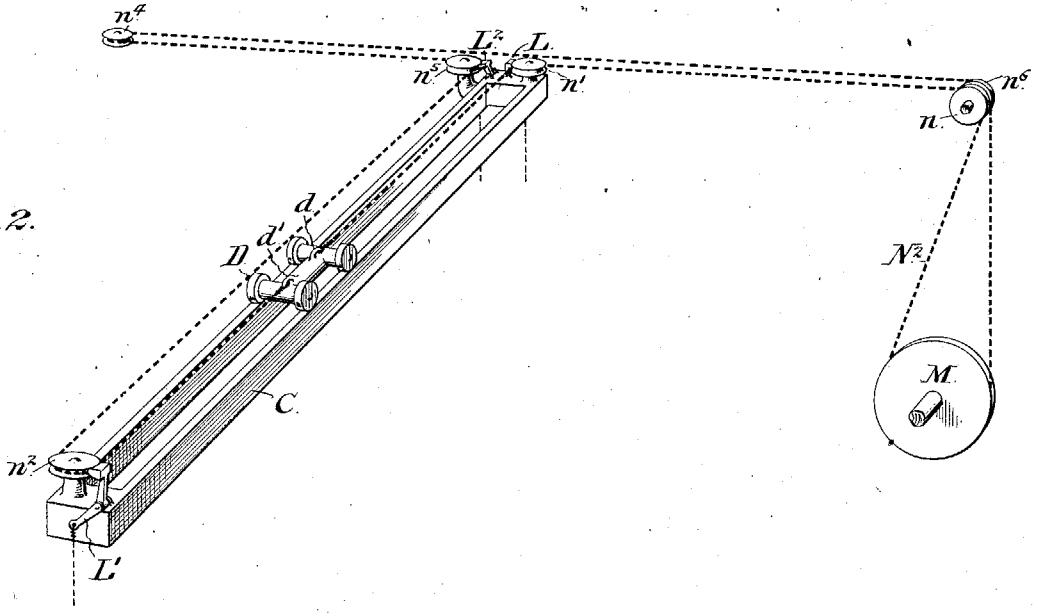
Figure 3:
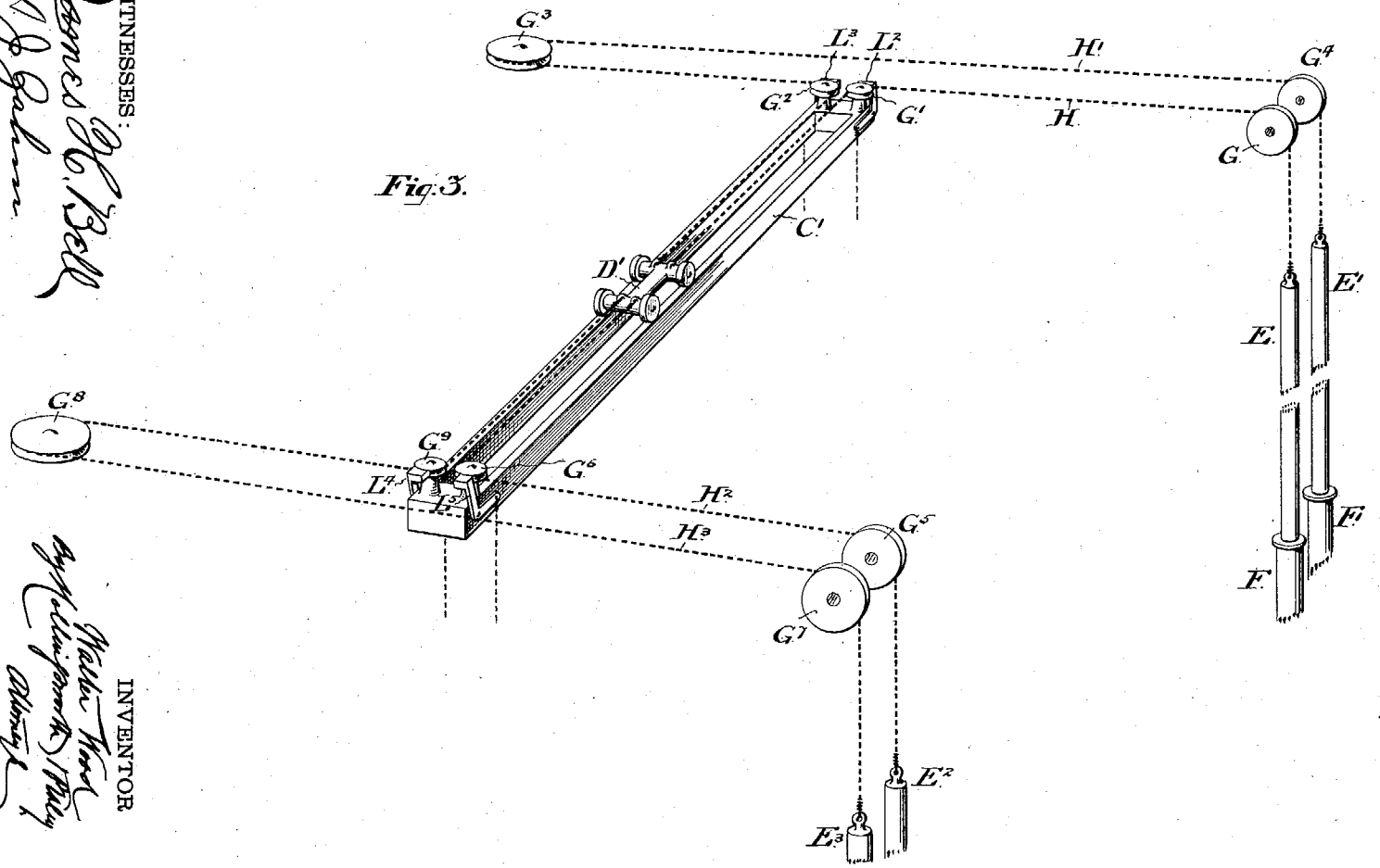
Figure 4:
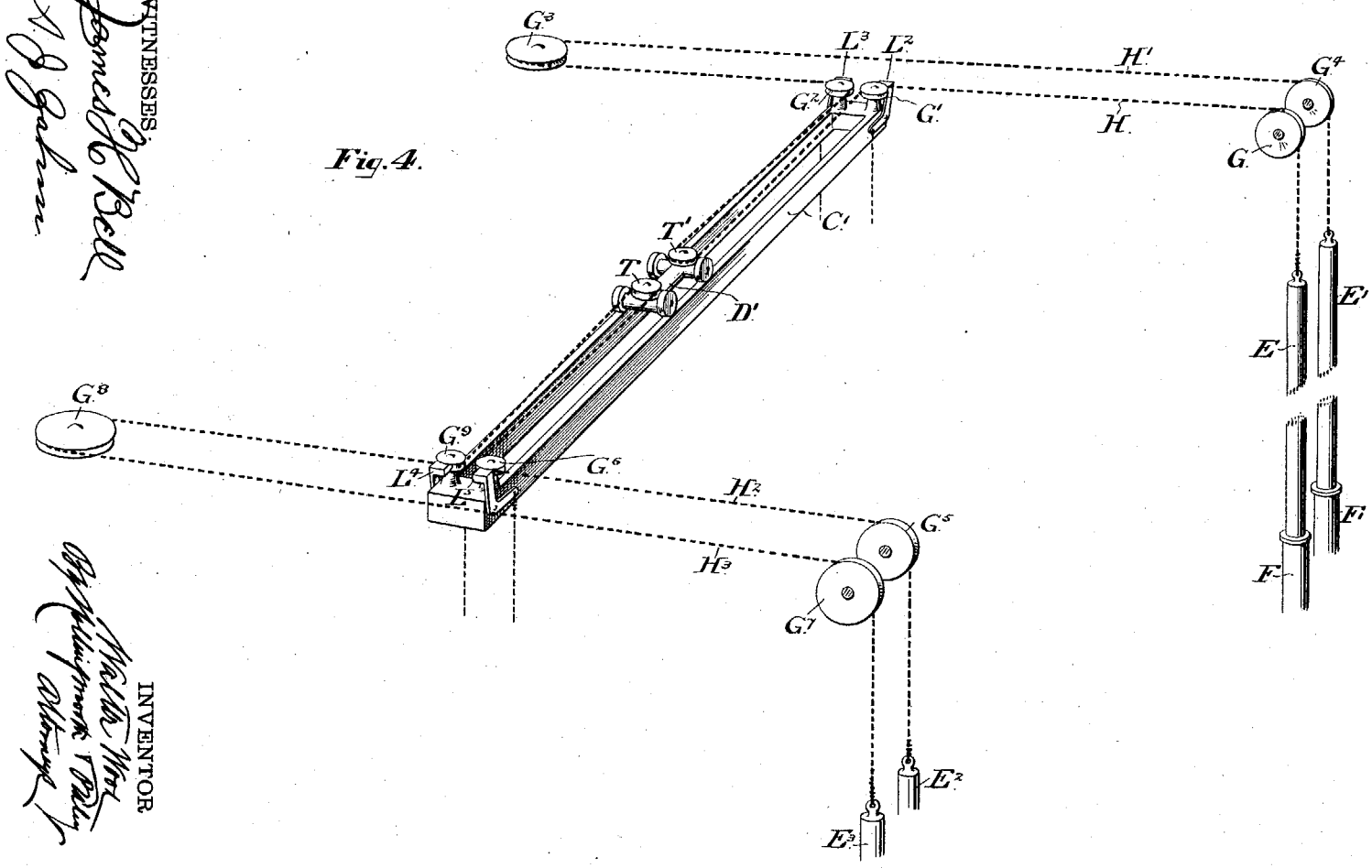

In the accompanying drawings, Figure 1 represents a partial view of the bridge and trolley of the traveling crane in perspective, showing a simple form of embodying the principles of my improvements. Fig. 2 represents a similar view, in perspective, of the same parts, showing another arrangement of the ropes. In both Figs. 1 and 2 the rope is represented as endless. Fig. 3 represents a partial view, in perspective, of another arrangement where two ropes are employed, neither of which is endless; and Fig. 4 represents another arrangement of two ropes similar to those of Fig. 3, but differently connected with the trolley.

I have omitted from said drawings any illustration of the ways upon which the bridge travels and of the lifting-rope which is combined with the trolley, since the construction and operation of these parts are well understood.

Referring now to Fig. 1, C represents the bridge provided with the usual rollers $c$ for the travel thereof upon longitudinal ways. D represents the trolley provided with rollers for traversing the bridge from end to end thereof. The source of power is represented in this instance by a drum M, actuated in any convenient manner and preferably arranged at one end of the ways, which for purposes of convenience will be termed the "initial" end. A rope N is coiled upon said drum, and passes thence (upon one side) over a pulley $n$, mounted at or near the commencement of the ways. Thence it leads to the bridge, where, after passing around a pulley $n'$ at one end thereof, it is connected with the trolley at the point $d$. The rope passes from the other side of the drum M, over a pulley $n^6$, arranged in proximity to the pulley $n$, and thence leads to the other end of the ways, where it passes around pulleys $n^4$ $n^5$, and thence returns to the end of the bridge opposite to that at which the other member of the rope entered. After passing around a pulley $n^2$ at said end of the bridge it leads to a point of attachment $d'$ upon the trolley. The rope N is thus theoretically endless or continuous, the trolley constituting, in effect, one portion thereof; but, as will be seen hereinafter, the continuity of the rope either at the actuating-point or at the trolley is not essential to the system of deriving the bridge and trolley movements from the same ropes. Either or both the pulleys $n'$ $n^2$ upon the bridge may be provided with brakes L L′, respectively, so arranged as to grip the rope or prevent its free movement at said points around the pulleys. So long as said brakes are inactive, the rope can run free upon all the pulleys of the system. It is obvious that the rotation of the drum in one direction or the other would cause a corresponding travel of the trolley along the bridge from end to end thereof. If, however, the free motion of the rope be checked at the bridge by the application of the brakes L L′, the trolley will remain stationary during the actuation of the rope, since that portion of the rope which is between the points of application of the brakes becomes temporarily inoperative. In such cases, however, the bridge itself will be shifted bodily in one direction or the other along its ways, according to the direction of the movement of the drum M.

In Fig. 2 the rope, instead of leaving the bridge at the pulley $n^2$ and passing directly to the distant end of the line along the wall of the building, passes back along the bridge and around a second horizontal pulley $n^5$ at the end where it first entered. Thence it passes to a pulley $n^4$ at the distant end of the ways and returns to the initial point. The operation is, however, similar to that just described. While I have described the rope as single in each of these instances, it must be understood that I use the word with reference to the fact that the bridge and trolley movements are both produced from the same rope and not necessarily as indicative of number. Thus without departing from the principles of operation the rope N might be duplicated upon the other side of the structure leading from a separate drum or actuating device to the bridge, and after connection with the trolley leaving the bridge at the end thereof opposite to that at which the described rope enters and leaves. The effect of such duplication will of course be to more thoroughly balance the strain upon the bridge when the ropes are actuated for the purpose of causing the travel of the same.

In Fig. 3 I have shown another arrangement where two sets of ropes are employed, neither being endless. In this case the source of power is represented as a series of hydraulic cylinders, two of which F F′ are shown. From the plunger E of the cylinder F the rope H leads from a pulley G, arranged near the commencement of the ways to one end of the bridge C′, where it passes around a pulley G′, and is attached to one end of the trolley D′. A second rope H′ leads from the plunger E′ of the cylinder F′ over a pulley $G^4$, arranged in proximity to the pulley G, and thence passes to the other end of the way upon that side, whence it returns around a pulley $G^3$ to a pulley $G^2$ to the same end of the bridge as that at which the first rope entered. Thence it passes to a fixed point of attachment upon the proximate end of the trolley D′. The pair of ropes upon the opposite side are similarly arranged—that is to say, from the plunger $E^2$ (which cylinder is not shown) the rope $H^2$ passes over a pulley $G^5$ at the commencement of the ways to a pulley $G^6$ upon the end of the bridge, and thence to the proximate end of the trolley D′. The other rope $H^3$ leads from the plunger $E^3$ over a pulley $G^7$, arranged in proximity to the pulley $G^5$, thence passes around the pulley $G^8$ at the distant end of the ways and returns to the end of the bridge, where it passes around the pulley $G^9$ and leads to a point of attachment on the proximate end of the trolley. The brakes $L^2$ $L^3$ control the movement of the rope at one end of the bridge, and then brakes $L^4$ $L^5$ control it in a similar manner at the other end thereof, said brakes being coupled or conjoined to separate uses, as may be desired. In this instance, the rope not being endless, the movements of the hydraulic plungers must be made in proper correspondence—that is to say, to shift the trolley the plungers E E′ must be actuated in one direction and the plungers $E^2$ $E^3$ in the converse direction. To produce the movement of the bridge, the plungers E and $E^2$ must be actuated in the same direction and the plungers E′ $E^3$ in the converse direction, the brakes in this latter case being of course applied at the bridge-pulleys.

In Fig. 4 the arrangement is in all respects similar to that of Fig. 3, except that the ropes are not secured to the trolley by fixed points, but pass around pulleys T T′, arranged at opposite ends of the trolley. The object of this method of arrangement is to obviate the necessity of moving both plungers of the pair whose ropes lead to the one end of the trolley, since it is obvious that the free running of the ropes around the trolley-pulleys T T′ will permit the proper action thereof, although only one of the plungers upon that side be actuated, provided the corresponding but converse movement be effected by the plunger upon the opposite side of the apparatus.

It will be observed that although the foregoing types of my invention differ in minor details, such as the number of actuating-ropes, the method of connecting them with the trolley, and the character of the actuating mechanism, yet in all cases the ropes which lead to the distant end of the line are arranged as freely-supported loops, which return in continuity to the initial end of the line. It is this characteristic feature which permits said ropes to be utilized for the production of the bridge movement, besides affording other advantages in shifting the trolley itself, and it must be observed that the particular course which said ropes may follow in leading to the distant end or in returning therefrom is not limited to the instances shown, but may be such as is found most convenient under the conditions of any given structure, the only essential point being that above mentioned as characteristic. Hence I desire to claim such arrangement of the trolley-rope as a substantive feature of improvement.

I am aware that it is not, broadly speaking, new to combine with bridgeways a bridge adapted to travel upon said ways, a trolley mounted upon said bridge and adapted to travel along the same, and two trolley-ropes, both extending along the line of travel of the bridge, one at one end of said bridge and the other at the other end of said bridge and each intermediate of its length led into the carriage connected with a portion of the same and led out again, and I do not desire to be understood as claiming such combination. Where, however, the arrangement which I thus disclaim has heretofore been used, the trolley-shifting ropes have been attached to fixed anchoring-points at one end of the line, and, though capable of being shortened or lengthened by the movement of the actuating mechanism, were incapable of lengthwise movement. Obviously such an arrangement lacks advantages which have been above specified and which are due to the return of the rope in continuity to the actuating mechanism and the free support of said rope not only at the ends of the bridge, but at the distant end of the line as well.

Having thus described my invention, I claim—

1. In a traveling crane, the combination of a transverse bridge adapted to travel on longitudinal ways, a trolley mounted upon said bridge and adapted to travel along the same, actuating mechanism arranged at a point independent of the structure, and actuating-ropes connected with respective ends of said trolley and leading therefrom on each side to the proximate end of the bridge, one of said ropes then leading directly from the bridge to the initial end of the ways, another of said ropes leading to the distant end of the ways, and thence returning in the form of a freely-supported continuous loop to the initial end of the ways and to the actuating mechanism, substantially as set forth.

2. In a traveling crane, the combination of a transverse bridge adapted to travel on longitudinal ways, a trolley mounted upon said bridge and adapted to travel along the same, an actuating-rope connected with each end of said trolley and leading therefrom on each side to the proximate end of the bridge, thence to the respective ends of the line, and thence to an actuating-point, pulleys for said rope arranged at opposite ends of the bridge, brake mechanism for one or more of said bridge-pulleys, and actuating mechanism for said rope, arranged at a point independent of the structure, substantially as set forth.

WALTER WOOD.

Witnesses:
JAMES H. BELL,
HENRY N. PAUL, Jr.